United States Patent [19]
Susaki et al.

[11] Patent Number: 5,746,178
[45] Date of Patent: May 5, 1998

[54] THROTTLE VALVE CONTROL SYSTEM OBTAINING CONTINUOUS SENSOR OUTPUT AND THROTTLE VALVE CONTROL METHOD THEREOF

[75] Inventors: Akira Susaki, Higashimurayama; Tsugio Tomita, Hitachi; Syuuichi Nakano, Hitachinaka; Koichi Ono, Naka-machi, all of Japan

[73] Assignees: Hitachi Ltd.; Hitachi Car Engineering Co., Ltd., both of Japan

[21] Appl. No.: 746,380

[22] Filed: Nov. 8, 1996

[30] Foreign Application Priority Data

Nov. 9, 1995 [JP] Japan .................. 7-291101

[51] Int. Cl.$^6$ .................. F02D 41/20
[52] U.S. Cl. .................. 123/399; 251/129.04
[58] Field of Search .................. 123/361, 399, 123/403; 251/129.04

[56] References Cited

U.S. PATENT DOCUMENTS 4,911,125  3/1990  Sugawara et al. .................. 123/399

FOREIGN PATENT DOCUMENTS 5-263703  10/1993  Japan.

*Primary Examiner*—Andrew M. Dolinar
*Attorney, Agent, or Firm*—Evenson, McKeown, Edwards & Lenahan, P.L.L.C.

[57] ABSTRACT

A throttle valve control system and a control method thereof prevents an output of throttle sensors from becoming discontinuous at a point of switching the throttle sensors, and obtains a continuous output over the whole range of the sensor output, and accordingly can perform highly accurate throttle control. The system includes a first A/D converter for converting an output signal of a throttle sensor into a digital signal, an amplifier for amplifying the output signal of the throttle sensor, a second A/D converter for converting the amplified output signal into a digital signal and an amplification factor adjuster for receiving outputs from one or the other of the A/D converters and scaling the received output signal. A correction is provided for the amplification factor of the adjuster whereby a continuous actual opening degree signal without any step is obtainable over the entire range of the throttle sensor output.

12 Claims, 8 Drawing Sheets

THROTTLE VALVE CONTROL SYSTEM OBTAINING CONTINUOUS SENSOR OUTPUT AND THROTTLE VALVE CONTROL METHOD THEREOF

BACKGROUND OF THE INVENTION

The present invention relates to a throttle valve control system and a throttle valve control method, and more particularly relates to a throttle valve control system and a throttle valve control method suitable for controlling a throttle valve in a small opening degree.

When an electronic control throttle is employed, an air flow rate can be controlled independently of a driver's stepping degree of an accelerator pedal. Therefore, various kinds of application of the electronic control throttle can be considered. Various kinds of functions, such as, control during warming-up an engine, control of rotating speed during idling operation of an engine, control during constant running of a vehicle and the like can be performed without attaching any additional special device to the throttle unit.

As an example, in a case where control of rotating speed during idling operation is performed by switching from a conventional control of an auxiliary air control valve to a direct throttle valve control, it is necessary to accurately perform the control under a condition where the throttle opening degree is low and within a narrow range.

In the past, high resolution control of a throttle valve opening within a range of low opening degrees has been attained through a method disclosed, for example, in Japanese Patent Application Laid-Open No. 5-263703. In this method, the resolution of a throttle sensor is improved by switching the reading process of an output of the throttle sensor depending on a high opening degree or a low opening degree. The output from the throttle sensor is directly input to a first A/D converter and an amplified signal of the output from the throttle sensor using an amplifier is input to a second A/D converter. Then, an output of the first A/D converter is input to a switch through a divider. In the switch, the output value of the second A/D converter is set as an actual opening value of the throttle when the throttle valve opening is in a low opening degree and the output value of the first A/D converter is set as the actual opening value of the throttle when the throttle valve opening is in a high opening degree. Accordingly, the control accuracy within a rage of low opening degrees of the throttle opening degree can be improved by preventing decrease in significant digits of the actual throttle opening signal for control calculation in a low opening degree of the throttle valve opening. Further, in a range of high opening degrees, the throttle valve can be controlled with maintaining the same control accuracy as in a case where the amplifier is not used.

However, in the aforementioned technology, when the amplification factor of the amplifier and dividing factor of the divider connected to the A/D converters shift from the design values in the process of calculating the output values of the A/D converters, there has been a problem in that the actual throttle opening degree value for control calculation becomes discontinuous at a point where the output value of the A/D converter is switched from the low opening degree side to the high opening side or vice versa. When there is such a discontinuity in the throttle opening degree value, there has been a problem in that the control accuracy of the throttle valve opening is decreased.

SUMMARY OF THE INVENTION

An object of the present invention is to provide a throttle valve control system and a throttle valve control method which can prevent an output of throttle sensors from becoming discontinuous at a point of switching the throttle sensors, and can obtain a continuous output over the whole range of the sensor output, and accordingly can perform highly accurate throttle control.

The object of the present invention can be attained by providing a throttle valve control system comprising a throttle valve for controlling an intake air flow rate supplied to an engine, a drive actuator for driving the throttle valve, a throttle sensor for detecting an opening degree of the throttle valve rotated by the drive actuator, a first A/D converter for converting an output signal of the throttle sensor into a digital signal, an amplifier for amplifying the output signal of the throttle sensor, a second A/D converter for converting the signal amplified by the amplifier into a digital signal, an amplification factor adjusting means for receiving an outputs from the first A/D converter or an output the second A/D converter and for converting the outputs of the two A/D converters to the same scale, wherein the drive actuator is controlled based on the output of the amplification factor adjusting means and the output of the A/D converter not through the amplification factor adjusting means. The throttle valve control system further comprises a correction means for outputting a coefficient for correcting an amplification factor of the amplification factor adjusting means or the amplifier based on the outputs of the first A/D converter and the second A/D converter to adjust the amplification factor. By providing such a construction, a continuous actual opening degree signal without any step can be obtained over the whole range of the throttle sensor outputs, and highly accurate throttle control can be performed.

In the throttle valve control system described above, it is preferable that the amplification factor adjusting means is a dividing means for dividing the output of the second A/D converter with a coefficient K and is connected to an output terminal of the second A/D converter.

In the throttle valve control system described above, it is preferable that the amplification factor adjusting means is a dividing means for dividing the output of the first A/D converter with a coefficient K and is connected to an output terminal of the first A/D converter.

In the throttle valve control system described above, it is preferable that the correcting means adjust the amplification factor at the time when the output of the second A/D converter is within a predetermined range. By such a construction, it is possible to maintain the accuracy of the coefficient and to eliminate an unnecessary correction process.

In the throttle valve control system described above, it is preferable that the upper limit value of the predetermined range is not smaller than an output value of the first A/D converter corresponding to the maximum opening degree of the throttle valve. By such a construction, it is possible to increase the significant digits of the output value of the A/D converter.

In the throttle valve control system described above, it is preferable that the correcting means judges whether the coefficient is within an allowable range, and adjusts the amplification factor if the coefficient is within the allowable range, and switches a switch means so as to select the output of the first A/D converter if the coefficient is out of the allowable range. By such a construction, it is possible to cope with an abnormal state of the amplifier.

In the throttle valve control system described above, it is preferable that the throttle valve control system further comprises a memory means for storing the coefficient, and the amplification factor is adjusted based on the coefficient stored in the memory means. By such a construction, it is possible to adjust using the stored value even when the power is turned on again.

In the throttle valve control system described above, it is preferable that the throttle valve control system further comprises a switch means for selectively switching the output of the amplification factor adjusting means and the output of the A/D converter not through the amplification factor adjusting means, and the drive actuator is controlled based on a difference between an actual opening degree signal instructing an actual throttle opening degree output from the switch means and a command opening degree signal for commanding a target throttle opening degree.

The above object of the present invention can be attained by providing a throttle valve control method for controlling a throttle valve by detecting an opening degree of the throttle valve, converting a signal amplifying the detected signal with a predetermined amplification factor into a digital signal, converting the detected signal not amplified into a digital signal, and multiplying a predetermined coefficient to one of the two digital signals so that both of the digital signals become signals having the same scale, the method comprises the step of correcting the coefficient or the amplification factor based on the two digital signals.

In the throttle valve control method described above, it is preferable that the method comprises the step of correcting the coefficient or the amplification factor if the digital signal converted from the amplified signal is within a predetermined range.

In the throttle valve control method described above, it is preferable that the upper limit value of the predetermined range is not smaller than a value of the digital signal not amplified corresponding to the maximum opening degree of the throttle valve.

In the throttle valve control method described above, it is preferable that the method comprises the step of judging whether the correction is within an allowable range, and adjusting the coefficient or the amplification factor if the correction is within the allowable range, and selecting the digital signal not amplified and setting the selected digital signal to an actual opening degree signal if the correction is out of the allowable range.

DETAILED DESCRIPTION OF THE PREFERRED EMBODIMENTS

An embodiment of the present invention will be described below, referring to FIG. 1 to FIG. 5.

Figure 1:
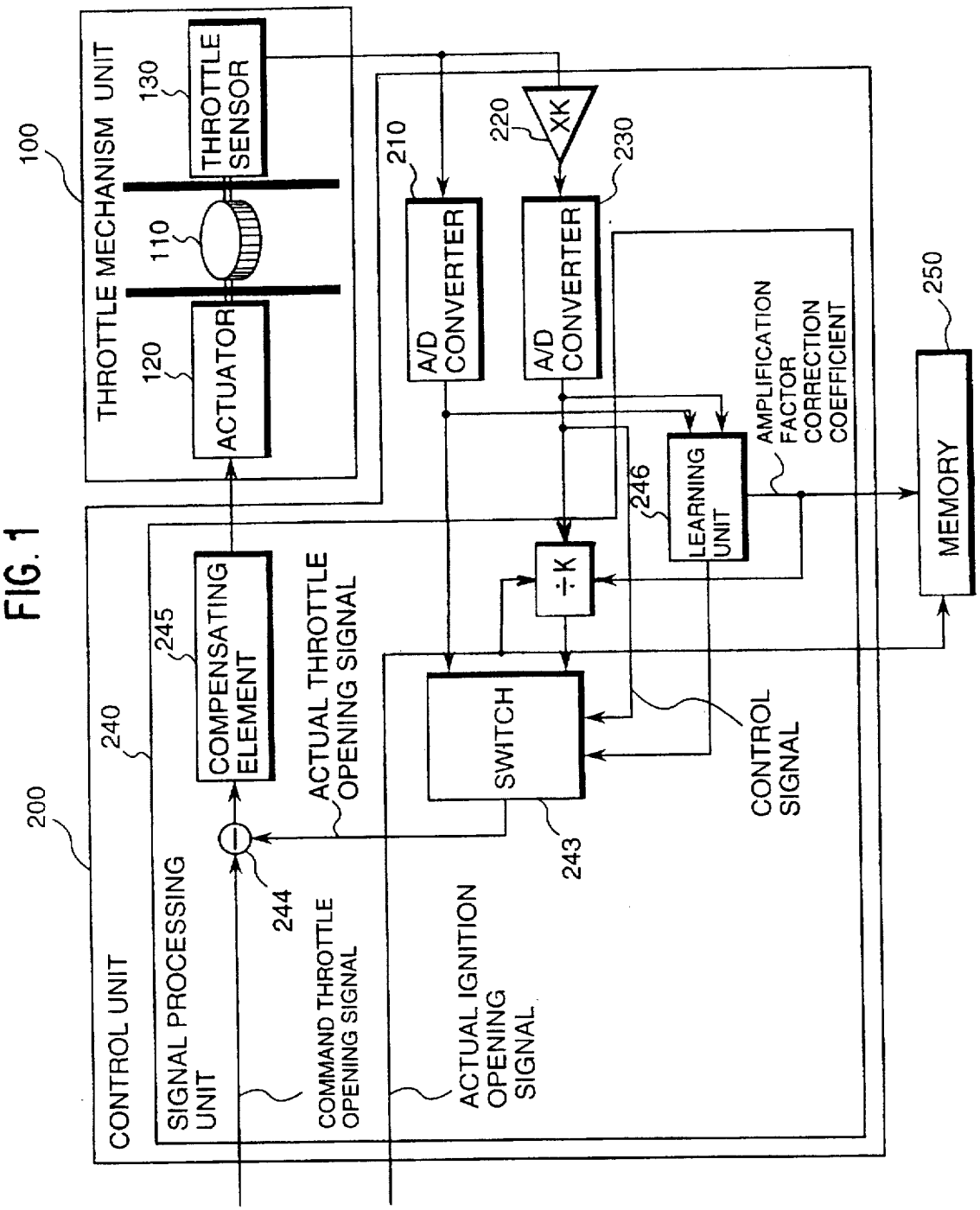
FIG. 1 is a block diagram showing a first embodiment of a throttle valve control system in accordance with the present invention.

FIG. 1 is a block diagram showing an embodiment of a throttle valve control system in accordance with the present invention.

The throttle valve control system comprises a throttle mechanism unit 100 and a control unit 200 for controlling the throttle valve mechanism unit. The throttle mechanism unit 100 comprises a throttle valve 110 ratably attached to an intake air passage, a drive actuator 120 for driving the throttle valve 110 and a throttle sensor 130 for detecting a rotating angle of the throttle valve 110 and outputting a throttle valve opening degree signal. The drive actuator 120 controls opening of the throttle valve 110 based on a control signal transmitted from the control unit 100. A flow rate of intake air supplied to an engine is controlled corresponding to the opening of the throttle valve 110.

An output of the throttle sensor 130 is directly input to an A/D converter 210 in the control unit 200 to be converted to a digital signal, and at the same time the output of the throttle sensor is amplified with an amplifier 220 and then input to an A/D converter 230 in the control unit 200 to be converted to a digital signal. Each of the A/D converters 210, 230 has a 16-bit A/D converter, for example, and upper 10 bits among the 16 bits are used so as to correspond to the maximum output of the throttle sensor 130. Therefore, the resolution is 1/1024. When the throttle valve 110 is rotated, for example, from the fully closed state (0°) to the fully opened state (75°), the output of the throttle sensor varies from 0 V to 3.5 V. Further, an amplification factor K of the amplifier 220 is set to 5. Therefore, the signals in the whole range of the opening degrees of the throttle valve 110 (0–3.5 V (=0°–75°)) are directly converted to digital signals by the A/D converter 210. On the other hand, the signals in the range of the low opening degrees of the throttle valve 110 (0–0.7 V (=0°–15°)) are amplified to signals of 0 V–3.5 V by the amplifier 220 and then converted to digital signals.

Each of the outputs of the A/D converters 210, 230 is input to a signal processing unit 240. The signal processing unit 240 is composed of, for example, a µ-CPU. The output of the A/D converter 230 is input to a switch 243 through a divider 241 of amplification factor adjusting unit. Here, the divider 241 has a divisor K which corresponds to the amplification factor K. On the other hand, the output of the A/D converter 210 is directly input to the switch 243.

Considering the signal flowing in the path of the amplifier 220, the A/D converter 230 and the divider 241, a signal in the range of the low opening degrees 0°–15°(=0 V–0.7 V) of the throttle valve 110 is multiplied by K (=5) times by the amplifier 220, and the amplified signal 0 V3.5 V is divided by 1/K by the divider 241 to be returned to a signal of 0 V–0.7 V. However, since the signal in the low opening degree region 0°–15° is input to the A/D converter 230 and is converted to a digital signal as a signal of 0 V–3.5 V, the resolution of a signal in the low opening degree region can be increased. The switch 243 receives the signal in the whole opening degree region of 0 V~3.5 V and the signal in the low opening degree region of 0 V~0.7 V. The switch 243 selectively switches the two inputs and inputs to a subtracter.

The switching by the switch 243 is performed based on the signal from the A/D converter 230, and a reference voltage is set, for example, to 3.5 V. If the output of the A/D converter 230 is lower then the reference value, the output of the divider 201 is selected by the switch 243. If the output of the A/D converter 230 is higher then the reference value, the output of the A/D converter 210 is selected by the switch 243. A difference between the actual throttle opening degree signal selected by the switch 243 as described above and a command throttle opening degree signal of a command value of throttle opening is obtained by the subtracter 244. The output of the subtracter 244 is transmitted to the drive actuator 120 in the throttle mechanism unit 100 through a compensating element unit composed of a PID calculation element and so on to drive the throttle valve 110.

The signal processing unit 240 controls the opening degree of the throttle valve 110 so that the throttle opening degree detected by the throttle sensor 130 agrees with the command throttle opening degree. The command throttle opening degree is obtained by a separate μCPU corresponding to a stepping amount of accelerator pedal and an operating state of a vehicle, not shown.

As described above, since the signal of the throttle sensor in the low opening degree range (0°~15°) of the throttle valve 110 is multiplied by K times (=5 times) and then converted into a digital signal by the A/D converter 230, the resolution is improved to 1/5120. Since the signal improved in the resolution is used for the control of the throttle opening degree, the control accuracy in the low opening degree range can be improved. Further, in the medium and high opening degree region (15°~75°), the control of the throttle opening degree can be performed using the output from the A/D converter 210 with the same accuracy as in the conventional system.

Furthermore, in the present embodiment, a learning unit 246 and a memory 250 are provided. Before describing operation of these components, the outputs of the A/D converters 210, 230 will be described, referring to FIG. 2.

Figure 2:
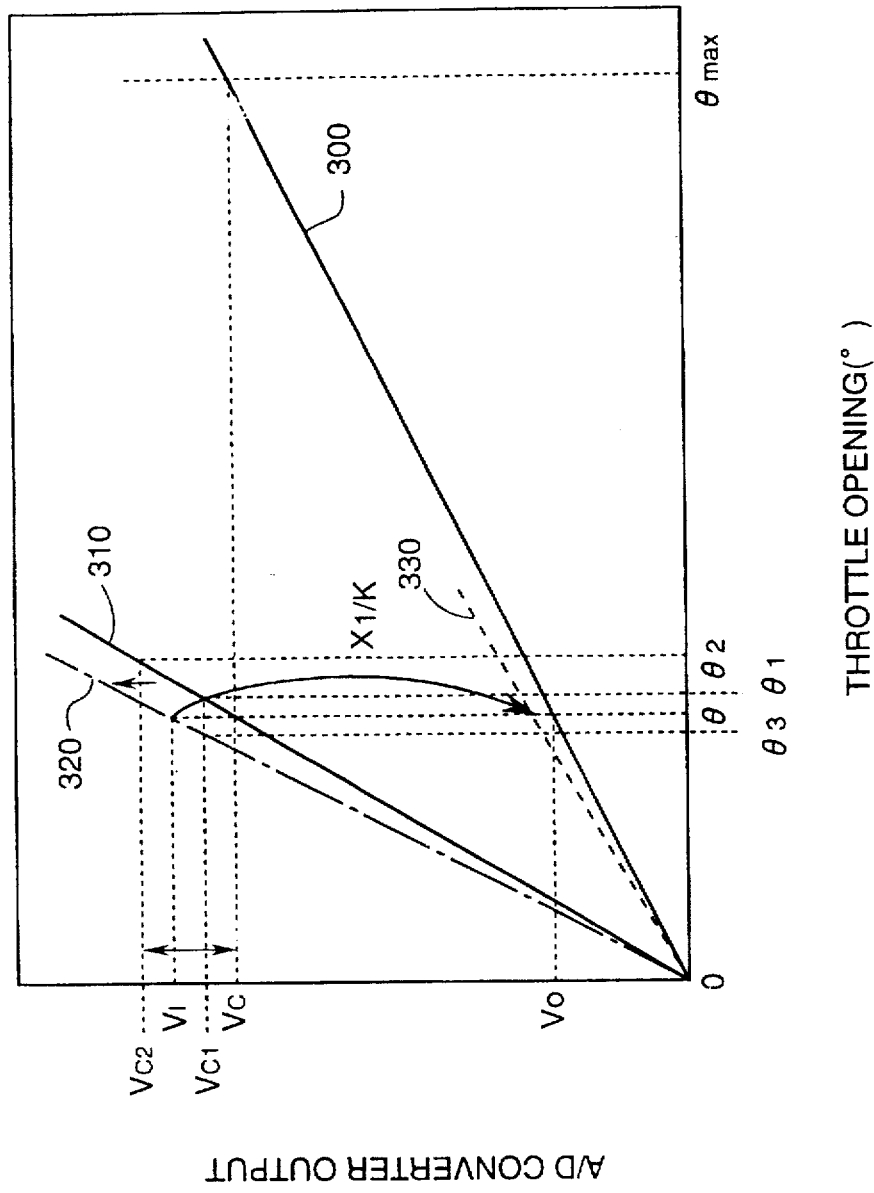
FIG. 2 is a diagram explaining the relationship between throttle opening degree and outputs of two A/D converters used for an embodiment of a throttle valve control system in accordance with the present invention.

FIG. 2 is a diagram explaining the relationship between the throttle opening degree and the outputs of the two A/D converters used for an embodiment of the throttle valve control system in accordance with the present invention.

The output of the A/D converter 210 varies from 0 V to $V_c$ V when the throttle opening degree varies from 0° to θmax, as shown by a solid line 300. Therein, for example, it is assumed that θmax is 75° and $V_c$ V is 3.5 V. On the other hand, the output of the A/D converter 230 varies as shown by a solid line 310, the output of the A/D converter at a throttle valve opening degree of θ is $V_c$ since the amplifier 220 is used. Therein, it is assumed that the amplification factor K of the amplifier 220 is set to 5, the output of the A/D converter becomes $V_c$ (=3.5) at θ of 15°.

However, since the amplifier 220 in this case is an analog amplifier, the amplification factor is difficult to be set accurately to five times, and is sometimes shifted from 5 times at the initial setting time, and is being shifting from 5 times over time in some cases. Therefore, when the amplification factor of the amplifier 220 is shifted to a value higher than 5 times, the output of the A/D converter 230 becomes as shown by a dot-dash line 320 in the figure.

Next, an actual throttle opening degree signal of an output of the switch 243 is described. Since the divider 241 is digitally processed in the signal processing unit 240, the divisor K can be always and accurately set, for example, to 5. Therefore, when the multiplying factor is accurately 5 and consequently the output of the A/D converter 230 has the characteristic as shown by the solid line 310, the characteristic of ⅕ of the output of the A/D converter 230 obtained using the divider 241 can be superposed on the characteristic shown by the solid line 300.

This relationship will be described below, referring to FIG. 3.

Figure 3:
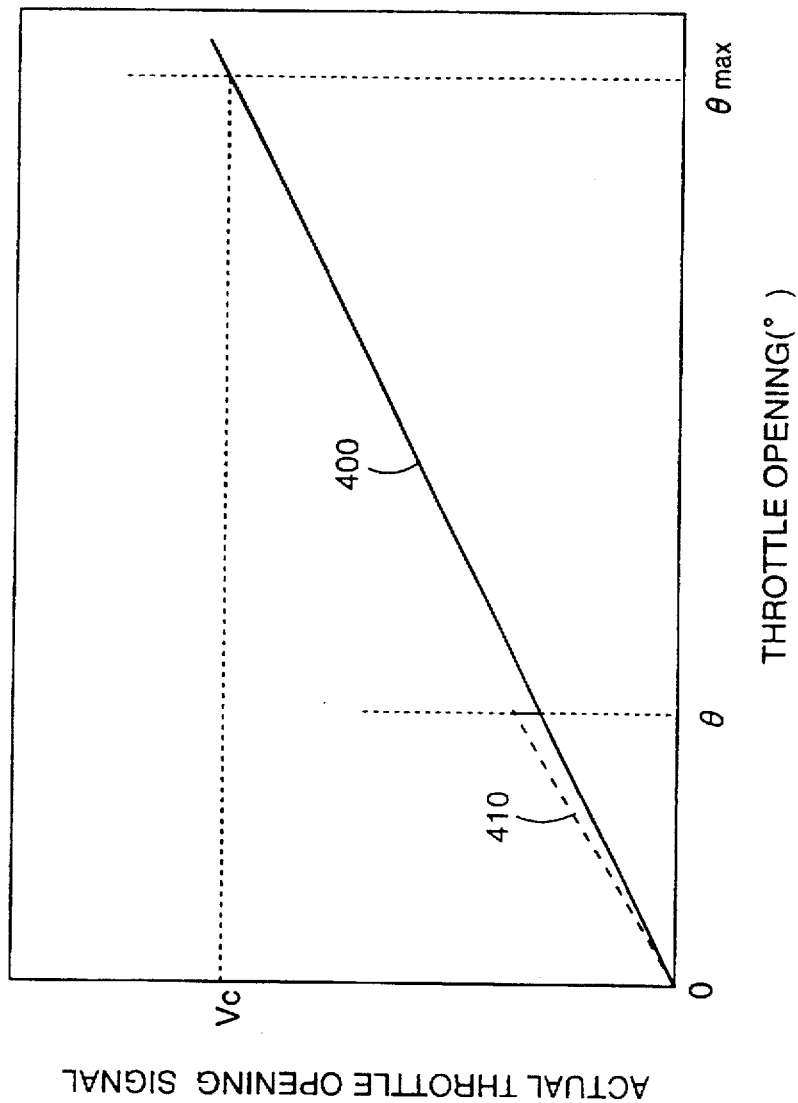
FIG. 3 is a diagram explaining the relationship between throttle opening degree and actual throttle opening degree signal which is an output of a switch used for an embodiment of a throttle valve control system in accordance with the present invention.

FIG. 3 is a diagram explaining the relationship between the throttle opening degree and the actual throttle opening degree signal which is the output of the switch used for an embodiment of the throttle valve control system in accordance with the present invention.

In a case where the amplification factor of the amplifier 220 is accurately K (=5), the characteristic of the actual throttle opening degree signal maintains a linear relationship even before and after the throttle opening degree θ of a switching point of the switch 243, as shown by a solid line 400 in FIG. 3.

However, in a case where the amplification factor of the amplifier 220 is larger than K (=5) as shown by the dot-dash line 320 in FIG. 2, the characteristic of the actual throttle opening degree signal becomes as shown by a dot line 330 in FIG. 2 when the characteristic of the divider is assumed to be 1/K. In other words, in FIG. 3, the actual throttle opening degree signal varies as shown by a dash line 410 as the throttle opening degree varies in the range of the throttle opening degrees of 0°~θ° (=15°). On the other hand, the output of the A/D converter 210 varies along the solid line 400. Therefore, the actual throttle opening degree signal varies along the dash line 410 in the left hand side of the throttle opening degree of θ in FIG. 3 and varies along the solid line 400 in the right hand side of the throttle opening degree of θ in FIG. 3. As the result, the characteristic of the actual throttle opening degree signal becomes discontinuous and has a step at the boundary of the throttle opening degree of θ.

Therefore, the leaning unit 246 receives the outputs of the A/D converter 210 and the A/D converter 230 and calculates a ratio of the both. That is, in FIG. 2, when the output of the A/D converter 230 is $V_c$ and the output of the A/D converter is $V_0$, the ratio of the both ($V_c/V_0$) is 5 which is equal to the amplification factor K (=5) of the amplifier 220. However, when the output of the A/D converter 230 changes from $V_c$ to $V_1$, the ratio $V_0$ to the output of the A/D converter 210 becomes $V_1/V_0$ which is larger than 5. Therefore, the learning unit 246 rewrites the divisor of the divider 241 to the ratio ($V_1/V_0$) as a new divisor K' of the amplification factor correcting coefficient. By rewriting the divisor K to the new divisor K' as described above, the output of the switch 243 becomes a straight line as shown by the solid line 400 in FIG. 3, and it is possible to eliminate the discontinuity in the actual throttle opening degree signal observed in the conventional system.

Further, the learning unit 246 stores this ratio ($V_1/V_0$) to the memory 250 as a new divisor K'. The memory 250 employs a rewritable and non-volatile memory such as an EP-ROM. Therefore, the content cannot be eliminated when an ignition switch of a vehicle is turned off. When the ignition switch of the vehicle is turned on and an ignition signal is input to the memory 250 and the divider 201, the divisor K' of the amplification factor correcting coefficient stored in the memory 250 is written in the divider 241 of the amplification factor adjusting unit. By doing so, change in the amplification factor of the amplifier 220 can be corrected based on the divisor K' and consequently it is possible to obtain the actual throttle opening degree signal to the throttle opening degree without the step.

Figure 7:
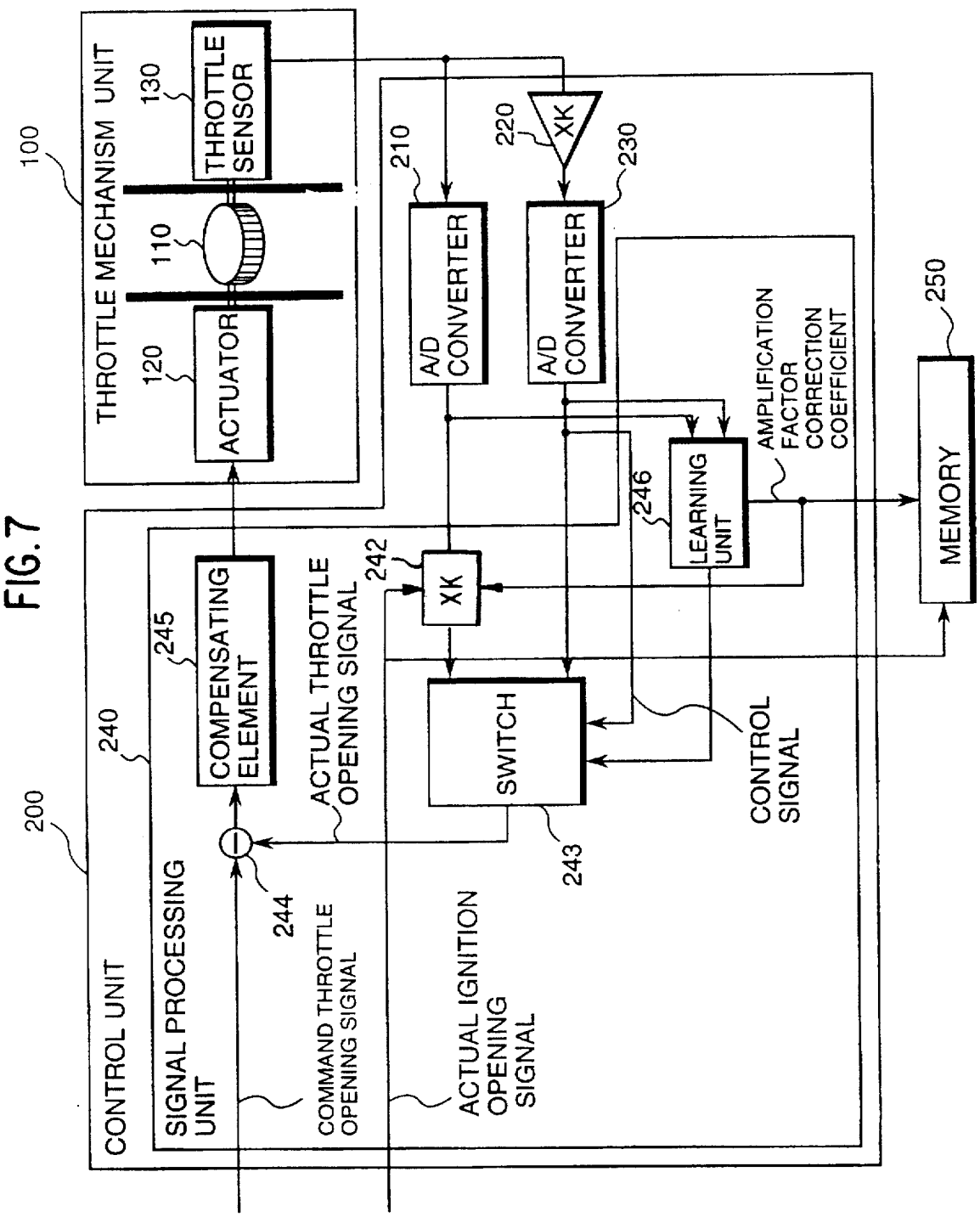
FIG. 7 is a block diagram similar to FIG. 1 but showing a third embodiment using a multiplier instead of a divider in the amplification factor adjusting unit.

Although, in the above explanation, the output of the A/D converter 230 is divided by the divisor K using the divider 241 in the embodiment of FIG. 7, the amplification factor adjusting unit may employ a multiplier connected to the output terminal of the A/D converter 210 instead of the divider 241. By setting the multiplying factor K (=5) of the multiplier 242, the output of the multiplier 242 and the output of the A/D converter 230 can be brought to the same level. Further, by rewriting the multiplying factor K to the new multiplying factor K' using the output of the learning unit 246, it is possible to obtain the actual throttle opening degree signal to the throttle opening degree without the step.

Since the case of using the divider 241 can be reduced the input level of the switch 243 to 1/5 as small as that in the case of using the multiplier 242, it is advantageous that the case of using the divider 241 when bit number of signal processing in the signal processing unit 240. However, when there are enough bit number of the signal processing in the signal processing unit 240, the method of using the multiplier 242 has an advantage in that a signal in the low opening degree range of the throttle opening can be used in a high resolution state as it is.

Content of operation of signal processing in the signal processing unit will be described below, referring to FIG. 4.

Figure 4:
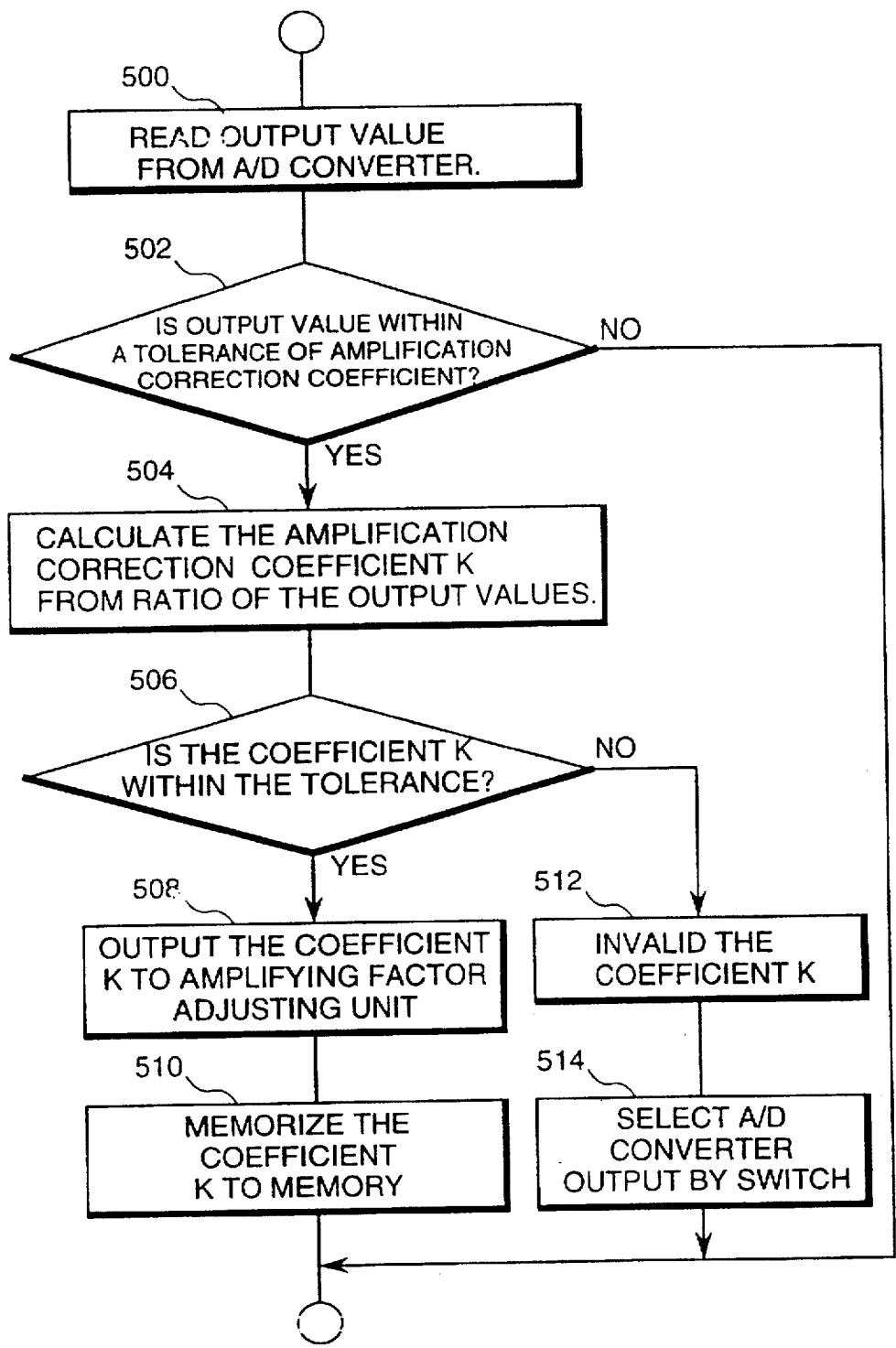
FIG. 4 is a flow diagram showing the operating contents of a signal processing unit in an embodiment of a throttle valve control system in accordance with the present invention.
Figure 5:
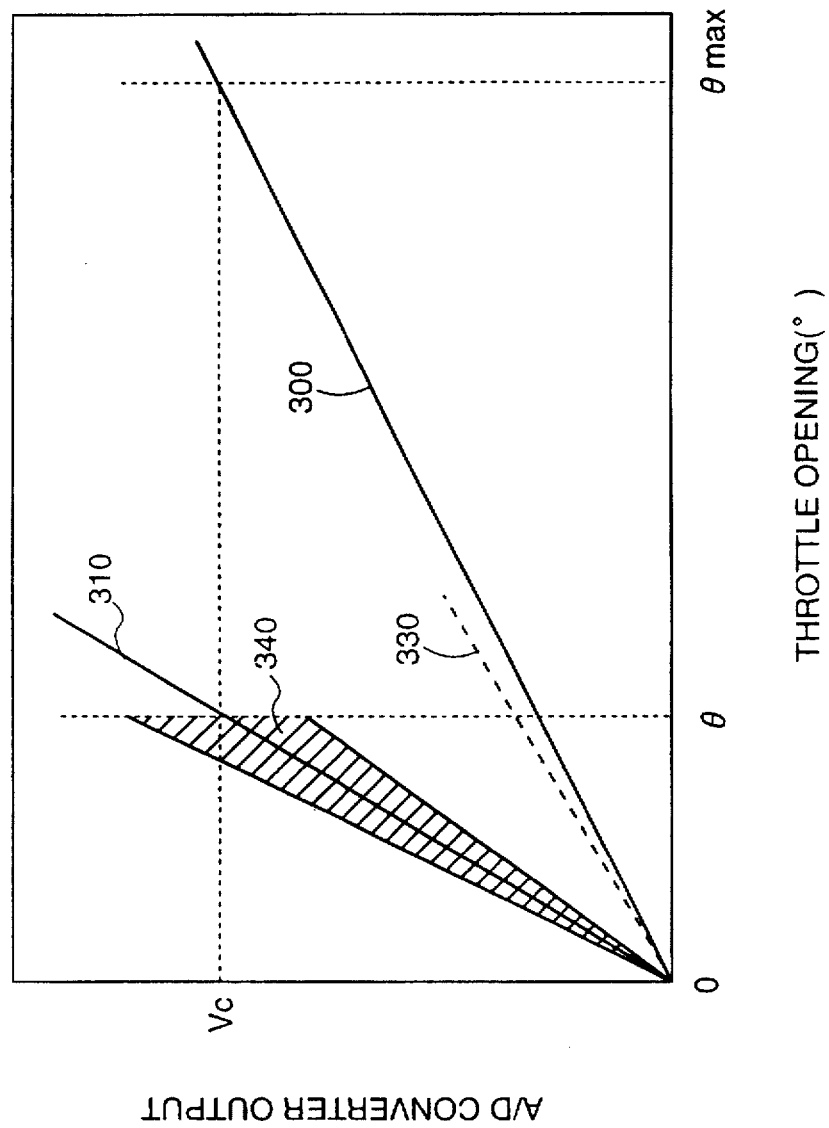
FIG. 5 is a diagram explaining the relationship between throttle opening degree and outputs of two A/D converters used for an embodiment of a throttle valve control system in accordance with the present invention.

FIG. 4 is a flow diagram showing the operating contents of the signal processing unit in an embodiment of the throttle valve control system in accordance with the present invention.

Initially, in Step 500, the learning unit 246 in the signal processing unit 240 reads output values of the A/D converter 210 and the A/D converter 230.

In Step 502, the leaning unit 246 judges whether the output value of the A/D converter 230 is within a correction permission range of the amplification factor correcting coefficient or not. Here, the term "within the correction permission range of the amplification factor correcting coefficient" means a state in which , in FIG. 2, the output of the A/D converter 230 is within the range of $V_{c1} \sim V_{c2}$. Therefore, in a case where the amplification factor of the amplifier 220 is accurately K (=5) and the output characteristic of the A/D converter to the throttle opening degree is expressed by the solid line 310, the throttle valve is gradually opened and the output of the A/D converter 230 at the throttle valve opening degree of $\theta_1$ is $V_{c1}$. Therefore, when the output value of the A/D converter 230 becomes this value, in Step 502, it is judged that the output value of the A/D converter 230 is within a correction permission range of the amplification factor correcting coefficient. Further, when the throttle valve is being closed from the full open state and the throttle opening degree becomes $\theta_2$, Step 502, it is judged that the output value of the A/D converter 230 is within a correction permission range of the amplification factor correcting coefficient.

Furthermore, assuming that the amplification factor K of the amplifier 230 varies and becomes to have, for example, the characteristic shown by the dot-dash line 320 in FIG. 2, the throttle valve is gradually being opened and the output of the A/D converter 230 becomes $V_{c1}$ when the throttle opening degree becomes $\theta_3$. Therefore, when the output of the A/D converter 230 becomes $V_{c1}$, in Step 502, it is judged that the output value of the A/D converter 230 is within a correction permission range of the amplification factor correcting coefficient. Further, when the throttle valve is being closed from the full open state and the throttle opening degree becomes $\theta_2$, Step 502, it is judged that the output value of the A/D converter 230 is within a correction permission range of the amplification factor correcting coefficient.

Therein, as $V_{c1}$ and $V_{c2}$ within the correction permission range, when $V_c$ is assumed to be, for example, 3.5 V, $V_{c1}$ is set to 3.6 V and $V_{c2}$ is set to 3.8 V. This means a case where the amplification factor correcting coefficient K' is a value within the range of K'=5.14 to 5.43 by changing from the initial value of K=5, that is, a case the amplification factor correcting coefficient K changes by 3% to 8%.

When the output of the A/D converter 230 is not within the correction permission range of the amplification factor correcting coefficient, no processing is performed. However, when the output of the A/D converter 230 is within the correction permission range of the amplification factor correcting coefficient, the processing proceeds to the next step of Step 504. By this judgment, the accuracy of the amplification factor correcting coefficient K' is maintained and at the same time unnecessary correcting processing can be avoided.

In Step 504, the learning unit 246 calculates a ratio of output values of the A/D converter 210 and the A/D converter 230 ($(V_c/V_0)$ in FIG. 2) and set the ratio to an amplification factor correcting coefficient K'.

Next, in Step 506, the learning unit 246 judges whether the obtained amplification factor correcting coefficient K' is within the allowable range or not. Here, the allowable range is set to the range of, for example, 4.8 to 5.2 when the amplification factor correcting coefficient K in the normal state is 5. If the obtained amplification factor correcting coefficient K' is within the allowable range, the processing proceeds to the next step of Step 508. By this judgment, when the amplification factor correcting coefficient K' becomes an abnormal value, it is judged that the amplifier 220 is in an abnormal condition and it is possible to avoid use of the output value of the amplifier 220.

In Step 508, the learning unit 246 outputs the obtained amplification factor correcting coefficient K' to the divider 241 of the amplification factor adjusting unit, and after that the dividing calculation is performed based on the new amplification factor correcting coefficient K'.

In Step 510, the learning unit 246 stores the obtained amplification factor correcting coefficient K' in the memory 250, and the processing is completed. By doing so, the amplification factor correcting coefficient K' can be maintained after the power is turned off, and accordingly it is possible to use the amplification factor correcting coefficient K' stored at the precedent time when the power is turned on in the next time.

In Step 506, if the obtained amplification factor correcting coefficient K' is not within the allowable range, the learning unit 246 negates the value of the obtained amplification factor correcting coefficient K' in Step 512.

When the calculated amplification factor correcting coefficient K' is far different from the amplification factor K of the amplifier 220, there might be some problems in the amplifier 220. Therefore, it is confirmed whether the amplification factor correcting coefficient K' is within a predetermined allowable range containing the amplification factor K in its specification of the amplifier 220 or not, and then the calculated amplification factor correcting coefficient K' is allowed to be used only when it is within the allowable range. When the output of the A/D converter 210 is converted based on the amplification factor correcting coefficient K' using the multiplier 242 of the amplification factor adjusting unit, it is expected that the converted characteristic comes within the range shown by hatching lines 340 in FIG. 5 if the amplification factor of the amplifier 220 is close to the amplification factor K in its specification.

However, if the amplification factor of the amplifier 220 is far different from the amplification factor K in its specification, the converted characteristic does not come within the range shown by hatching lines 340. The output characteristic of the A/D converter 230 shown by the solid line 310 can be converted to the same characteristic of the A/D converter 210 shown by the solid line 300 only when the converted characteristic comes within the range shown by hatching lines 340. Therefore, in order to correct the output of the A/D converter 210 so as to come to the same characteristic shown by the line 300, the value of the amplification factor correcting coefficient K' is far different from the amplification factor K in its specification. In this case, the amplification factor correcting coefficient K' is not used, but the control of the throttle valve 110 is performed over the whole range of 0 to $\theta_{max}$ based on the output characteristic of the A/D converter 210. For this purpose, in Step 514, the learning unit 246 outputs a control signal to the switch 243 so that the switch 243 selects the output of the A/D converter 210.

Therein, by setting the correction permission range ($V_{c1} \sim V_{c2}$) to a part of large output values of the A/D converter 230, the amplification factor correcting coefficient K' can be highly accurately obtained since the significant digits of the output of the A/D converter 230 and the output of the A/D converter 210 are increased. Further, by correcting the amplification factor correcting coefficient K' only within the range of the correction permission range ($V_{c1} \sim V_{c2}$), it is possible to avoid an unnecessary calculation of the amplification factor correcting coefficient K' in a range where the amplification factor correcting coefficient K' cannot be accurately obtained.

According to the present embodiment, by correcting the amplification factor correcting coefficient K' based on the output value of the A/D converter 210 and the output value of the A/D converter 230, it is possible to prevent the actual throttle opening degree signal from becoming discontinuous at the throttle opening degree of θ where the output values are switched, and it is possible to obtain the continuous actual throttle opening degree signal in the low output range of the throttle sensor 130 with maintaining a high control accuracy.

Another embodiment of the present invention will be described below, referring to FIG. 6.

Figure 6:
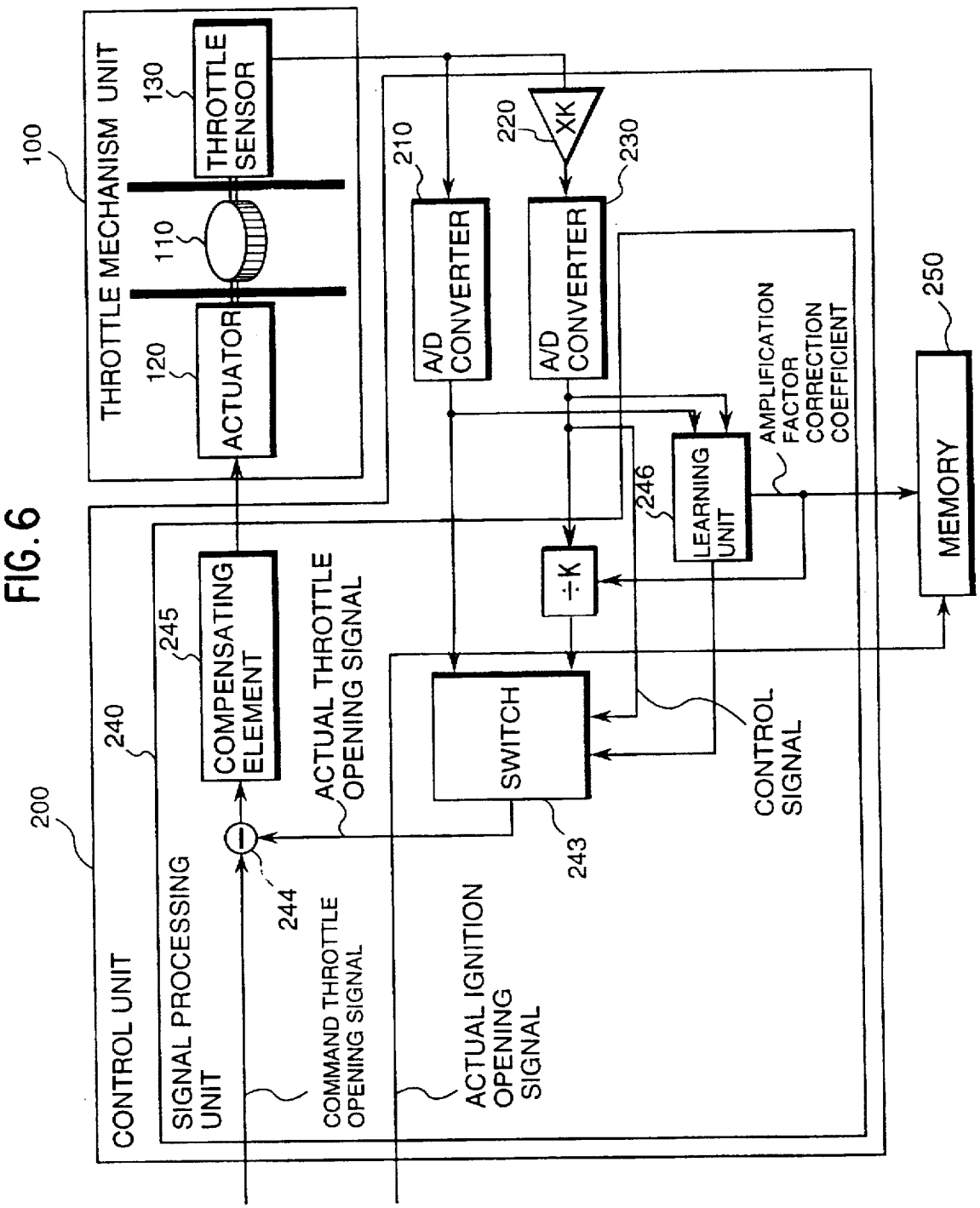
FIG. 6 is a block diagram showing a second embodiment of a throttle valve control system in accordance with the present invention.

FIG. 6 is a block diagram showing an embodiment of a throttle valve control system in accordance with the present invention.

The throttle valve control system comprises a throttle mechanism unit 100 and a control unit 200 for controlling the throttle valve mechanism unit. The throttle mechanism unit 100 comprises a throttle valve 110 ratably attached to an intake air passage, a drive actuator 120 for driving the throttle valve 110 and a throttle sensor 130 for detecting a rotating angle of the throttle valve 110 and outputting a throttle valve opening degree signal. The drive actuator 120 controls opening of the throttle valve 110 based on a control signal transmitted from the control unit 100. A flow rate of intake air supplied to an engine is controlled corresponding to the opening of the throttle valve 110.

An output of the throttle sensor 130 is directly input to an A/D converter 610 in the control unit 600 to be converted to a digital signal, and at the same time the output of the throttle sensor is amplified with an amplifier 620 and then input to an A/D converter 630 in the control unit 600 to be converted to a digital signal. Each of the A/D converters 610, 630 has a 16-bit A/D converter, for example, and upper 10 bits among the 16 bit its are used so as to correspond to the maximum output of the throttle sensor 130. Therefore, the resolution is 1/1024. When the throttle valve 110 is rotated, for example, from the fully closed state (0°) to the fully opened state (75°), the output of the throttle sensor varies from 0 V to 3.5 V. Further, an amplification factor K of the amplifier 620 is set to 5. Therefore, the signals in the whole range of the opening degrees of the throttle valve 110 (0~3.5 V (=0°~75°)) are directly converted to digital signals by the A/D converter 610. On the other hand, the signals in the range of the low opening degrees of the throttle valve 110 (0~0.7 V (=0°~15°)) are amplified to signals of 0 V~3.5 V by the amplifier 620 and then converted to digital signals.

Each of the outputs of the A/D converters 610, 630 is input to a signal processing unit 640. The signal processing unit 640 is composed of, for example, a μ-CPU. The output of the A/D converter 630 is input to a switch 643 through a divider 641 of amplification factor adjusting unit. Here, the divider 641 has a divisor K which corresponds to the amplification factor K. On the other hand, the output of the A/D converter 610 is directly input to the switch 643.

Considering the signal flowing in the path of the amplifier 620, the A/D converter 630 and the divider 641, a signal in the range of the low opening degrees 0°~15° (=0 V~0.7 V) of the throttle valve 110 is multiplied by K (=5) times by the amplifier 620, and the amplified signal 0 V~3.5 V is divided by 1/K by the divider 641 to be returned to a signal of 0 V~0.7 V. However, since the signal in the low opening degree region 0°~15° is input to the A/D converter 630 and is converted to a digital signal as a signal of 0 V~3.5 V, the resolution of a signal in the low opening degree region can be increased. The switch 643 receives the signal in the whole opening degree region of 0 V~3.5 V and the signal in the low opening degree region of 0 V~0.7 V. The switch 643 selectively switches the two inputs and inputs to a subtracter.

The switching by the switch 643 is performed based on the signal from the A/D converter 630, and a reference voltage is set, for example, to 3.5 V. If the output of the A/D converter 630 is lower then the reference value, the output of the divider 601 is selected by the switch 643. If the output of the A/D converter 630 is higher then the reference value, the output of the A/D converter 610 is selected by the switch 643. A difference between the actual throttle opening degree signal selected by the switch 643 as described above and a command throttle opening degree signal of a command value of throttle opening is obtained by the subtracter 644. The output of the subtracter 644 is transmitted to the drive actuator 120 in the throttle mechanism unit 100 through a compensating element unit composed of a PID calculation element and so on to drive the throttle valve 110.

The signal processing unit 640 controls the opening degree of the throttle valve 110 so that the throttle opening degree detected by the throttle sensor 130 agrees with the command throttle opening degree. The command throttle opening degree is obtained by a separate μ-CPU corresponding to a stepping amount of accelerator pedal and an operating state of a vehicle, not shown.

As described above, since the signal of the throttle sensor in the low opening degree range (0°~15°) of the throttle valve 110 is multiplied by K times (=5 times) and then converted into a digital signal by the A/D converter 630, the resolution is improved to 1/5120. Since the signal improved in the resolution is used for the control of the throttle opening degree, the control accuracy in the low opening degree range can be improved. Further, in the medium and high opening degree region (15°–75°), the control of the throttle opening degree can be performed using the output from the A/D converter 610 with the same accuracy as in the conventional system.

Furthermore, in the present embodiment, an amplification factor calculating unit 647 and a memory 250 are provided. The outputs of the A/D converters 610, 630 are the same as those described with referring to FIG. 2 The output of the A/D converter 610 varies from 0 V to $V_c$ V when the throttle opening degree varies from 0° to $\theta_{max}$, as shown by a solid line 300. Therein, for example, it is assumed that $\theta_{max}$ is 75° and $V_c$ V is 3.5 V. On the other hand, the output of the A/D converter 630 varies as shown by a solid line 310, the output of the A/D converter at a throttle valve opening degree of $\theta$ is $V_c$ since the amplifier 620 is used. Therein, it is assumed that the amplification factor K of the amplifier 620 is set to 5, the output of the A/D converter becomes $V_c$ (=3.5) at $\theta$ of 15°.

However, since the amplifier 620 in this case is an analog amplifier, the amplification factor is difficult to be set accurately to five times, and is sometimes shifted from 5 times at the initial setting time, and is being shifting from 5 times over time in some cases. Therefore, when the amplification factor of the amplifier 620 is shifted to a value higher than 5 times, the output of the A/D converter 630 becomes as shown by a dot-dash line 320 in the figure.

Next, an actual throttle opening degree signal of an output of the switch 643 is described. Since the divider 641 is digitally processed in the signal processing unit 640, the divisor K can be always and accurately set, for example, to 5. Therefore, when the multiplying factor is accurately 5 and consequently the output of the A/D converter 630 has the characteristic as shown by the solid line 310, the characteristic of 1/5 of the output of the A/D converter 630 obtained using the divider 641 can be superposed on the characteristic shown by the solid line 300.

In a case where the amplification factor of the amplifier 620 is accurately K (=5), the characteristic of the actual throttle opening degree signal maintains a linear relationship even before and after the throttle opening degree $\theta$ of a switching point of the switch 643, as shown by a solid line 400 in FIG. 3.

However, in a case where the amplification factor of the amplifier 620 is larger than K (=5) as shown by the dot-dash line 320 in FIG. 2, the characteristic of the actual throttle opening degree signal becomes as shown by a dot line 330 in FIG. 2 when the characteristic of the divider is assumed to be 1/K. In other words, in FIG. 3, the actual throttle opening degree signal varies as shown by a dash line 410 as the throttle opening degree varies in the range of the throttle opening degrees of 0°–$\theta$° (=15°). On the other hand, the output of the A/D converter 610 varies along the solid line 400. Therefore, the actual throttle opening degree signal varies along the dash line 410 in the left hand side of the throttle opening degree of $\theta$ in FIG. 3 and varies along the solid line 400 in the right hand side of the throttle opening degree of $\theta$ in FIG. 3. As the result, the characteristic of the actual throttle opening degree signal becomes discontinuous and has a step at the boundary of the throttle opening degree of $\theta$.

Therefore, the amplification factor calculating unit 647 receives the outputs of the A/D converter 610 and the A/D converter 630 and calculates a ratio of the both. That is, in FIG. 2, when the output of the A/D converter 630 is $V_c$ and the output of the A/D converter is $V_0$, the ratio of the both ($V_c/V_0$) is 5 which is equal to the amplification factor K (=5) of the amplifier 220. However, when the output of the A/D converter 630 changes from $V_c$ to $V_1$, the ratio $V_0$ to the output of the A/D converter 610 becomes $V_1/V_0$ which is larger than 5. Therefore, the amplification factor calculating unit 647 changes the amplification factor of the amplifier 620 capable of varying its amplification factor to the ratio ($V_1/V_0$) as a new amplification factor K" of the amplification factor changing coefficient. By changing the amplification factor K to the new amplification factor K" as described above, the output of the switch 243 becomes a straight line as shown by the solid line 400 in FIG. 3, and it is possible to eliminate the discontinuity in the actual throttle opening degree signal observed in the conventional system.

Further, the amplification factor calculating unit 647 stores this ratio ($V_1/V_0$) to the memory 250 as a new amplification factor K". The memory 250 employs a rewritable and non-volatile memory such as an EP-ROM. Therefore, the content cannot be eliminated when an ignition switch of a vehicle is turned off. When the ignition switch of the vehicle is turned on and an ignition signal is input to the memory 250 and the divider 601, the amplification factor of the amplifier 620 of the amplification factor adjusting unit is changed to the amplification factor K" of the amplification factor correcting coefficient stored in the memory 250. By correcting change in the amplification factor of the amplifier 620 based on the amplification factor K", it is also possible to obtain the actual throttle opening degree signal to the throttle opening degree without the step.

Figure 8:
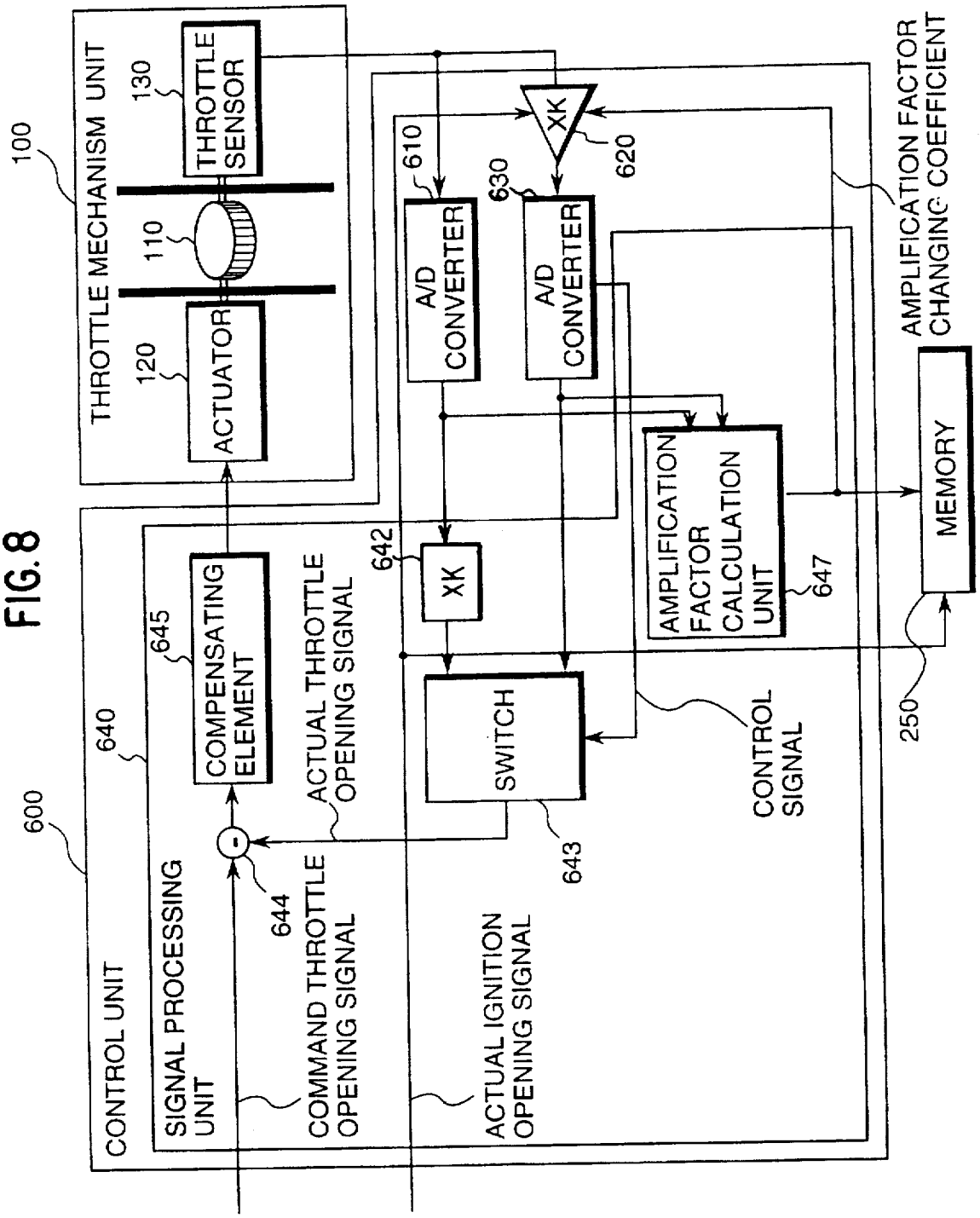
FIG. 8 is a block diagram similar to FIG. 6 but showing a fourth embodiment using a multiplier instead of a divider in the amplification factor adjusting unit.

Although, in the above explanation, the output of the A/D converter 630 is divided by the divisor K using the divider 641 in the embodiment of FIG. 8, a multiplier 642 connected to the output terminal of the A/D converter 610 may be employed instead of the divider 641. By setting the multiplying factor K (=5) of the multiplier 642, the output of the multiplier 642 and the output of the A/D converter 630 can be brought to the same level.

Since the case of using the divider 641 can be reduced the input level of the switch 643 to 1/5 as small as that in the case of using the multiplier 642, it is advantageous that the case of using the divider 641 when bit number of signal processing in the signal processing unit 640. However, when there are enough bit number of the signal processing in the signal processing unit 640, the method of using the multiplier 642 has an advantage in that a signal in the low opening degree range of the throttle opening can be used in a high resolution state as it is.

Content of operation of signal processing in the signal processing unit will be described below.

The amplification factor calculating unit 647 in the signal processing unit 640 reads output values of the A/D converter 610 and the A/D converter 630. The amplification factor calculating unit 647 judges whether the output value of the A/D converter 630 is within a changing permission range of the amplification factor changing coefficient or not. Here, the term "within the changing permission range of the amplification factor changing coefficient" means a state in which, in FIG. 2, the output of the A/D converter 630 is within the range of $V_c$–$V_{c2}$. Therefore, in a case where the amplification factor of the amplifier 620 is accurately K (=5) and the output characteristic of the A/D converter to the throttle opening degree is expressed by the solid line 310, the throttle valve is gradually opened and the output of the A/D converter 630 at the throttle valve opening degree of $\theta_1$ is $V_{c1}$. Therefore, when the output value of the A/D converter 630 becomes this value, it is judged that the output value of the A/D converter 630 is within a changing permission range of the amplification factor changing coefficient. Further, when the throttle valve is being closed from the full open state and the throttle opening degree becomes $\theta_2$, it is judged that the output value of the A/D converter 630 is within a changing permission range of the amplification factor changing coefficient.

Furthermore, assuming that the amplification factor K of the amplifier 630 varies and becomes to have, for example, the characteristic shown by the dot-dash line 320 in FIG. 2, the throttle valve is gradually being opened and the output of the A/D converter 630 becomes $V_{c1}$ when the throttle opening degree becomes $\theta_3$. Therefore, when the output of the A/D converter 630 becomes $V_{c1}$, it is judged that the output value of the A/D converter 630 is within a changing permission range of the amplification factor changing coefficient. Further, when the throttle valve is being closed from the full open state and the throttle opening degree becomes $\theta_2$, it is judged that the output value of the A/D converter 630 is within a changing permission range of the amplification factor changing coefficient.

Therein, as $V_{c1}$ and $V_{c2}$ within the changing permission range, when $V_c$ is assumed to be, for example, 3.5 V, $V_{c1}$ is set to 3.6 V and $V_{c2}$ is set to 3.8 V. This means a case where the amplification factor changing coefficient K" is a value within the range of K"=5.14 to 5.43 by changing from the initial value of K=5, that is, a case the amplification factor changing coefficient K changes by 3% to 8%.

When the output of the A/D converter 630 is not within the changing permission range of the amplification factor changing coefficient, no processing is performed. However, when the output of the A/D converter 630 is within the changing permission range of the amplification factor changing coefficient, the amplification factor calculating unit 646 calculates a ratio of the output of the A/D converter 610 to the output of the A/D converter 630 (($V_c/V_0$) in FIG. 2), and the ratio is set to the amplification factor changing coefficient. By this judgment, the accuracy of the amplification factor changing coefficient K" is maintained and at the same time unnecessary changing processing can be avoided.

Next, the amplification factor calculating unit 647 judges whether the obtained amplification factor changing coefficient K" is within the allowable range or not. Here, the allowable range is set to the range of, for example, 4.8 to 5.2 when the amplification factor changing coefficient K in the normal state is 5. If the obtained amplification factor changing coefficient K" is within the allowable range, the amplification factor calculating unit 647 output the obtained amplification factor changing coefficient K" to the divider 641 of the amplification factor adjusting unit and after that the divider 641 calculates based on the new amplification factor changing coefficient K". By this judgment, when the amplification factor changing coefficient K" becomes an abnormal value, it is judged that the amplifier 620 is in an abnormal condition and it is possible to avoid use of the output value of the amplifier 620.

The learning unit 647 stores the obtained amplification factor changing coefficient K" in the memory 250, and the processing is completed. By doing so, the amplification factor correcting coefficient K' can be maintained after the power is turned off, and accordingly it is possible to use the amplification factor changing coefficient K" stored at the precedent time when the power is turned on in the next time.

If the obtained amplification factor changing coefficient K" is not within the allowable range, the amplification factor changing unit 647 negates the value of the obtained amplification factor changing coefficient K".

When the calculated amplification factor changing coefficient K" is far different from the amplification factor K of the amplifier 620, there might be some problems in the amplifier 620. Therefore, it is confirmed whether the amplification factor changing coefficient K" is within a predetermined allowable range containing the amplification factor K in its specification of the amplifier 620 or not, and then the calculated amplification factor changing coefficient K" is allowed to be used only when it is within the allowable range. When the output of the A/D converter 610 is converted based on the amplification factor changing coefficient K" using the multiplier 642 of the amplification factor adjusting unit, it is expected that the converted characteristic comes within the range shown by hatching lines 340 in FIG. 5 if the amplification factor of the amplifier 620 is close to the amplification factor K in its specification.

However, if the amplification factor of the amplifier 620 is far different from the amplification factor K in its specification, the converted characteristic does not come within the range shown by hatching lines 340. The output characteristic of the A/D converter 630 shown by the solid line 310 can be converted to the same characteristic of the A/D converter 610 shown by the solid line 300 only when the converted characteristic comes within the range shown by hatching lines 340. Therefore, in order to correct the output of the A/D converter 610 so as to come to the same characteristic shown by the line 300, the value of the amplification factor changing coefficient K" is far different from the amplification factor K in its specification. In this case, the amplification factor changing coefficient K" is not used, but the control of the throttle valve 110 is performed over the whole range of 0 to $\theta_{max}$ based on the output characteristic of the A/D converter 610. For this purpose, the amplification factor calculating unit 647 outputs a control signal to the switch 643 so that the switch 643 selects the output of the A/D converter 610.

Therein, by setting the changing permission range ($V_{c1} \sim V_{c2}$) to a part of large output values of the A/D converter 630, the amplification factor changing coefficient K" can be highly accurately obtained since the significant digits of the output of the A/D converter 630 and the output of the A/D converter 610 are increased. Further, by changing the amplification factor changing coefficient K" only within the range of the changing permission range ($V_{c1} \sim V_{c2}$), it is possible to avoid an unnecessary calculation of the amplification factor changing coefficient K" in a range where the amplification factor changing coefficient K" cannot be accurately obtained.

According to the present embodiment, by changing the amplification factor changing coefficient K" based on the output value of the A/D converter 610 and the output value of the A/D converter 630, it is possible to prevent the actual throttle opening degree signal from becoming discontinuous at the throttle opening degree of $\theta$ where the output values are switched, and it is possible to obtain the continuous actual throttle opening degree signal in the low output range of the throttle sensor 130 with maintaining a high control accuracy.

According to the present invention, in the throttle valve control system and the throttle valve control method, it is possible to prevent the output of the throttle sensor from becoming discontinuous at the sensor switching point, and to obtain the continuos output over the whole range of the sensor output, and to perform highly accurate throttle control.

What is claimed is:

1. A throttle valve control system, comprising:

a throttle valve for controlling an intake air flow rate supplied to an engine and a drive actuator for driving the throttle valve;

a throttle sensor for detecting an opening degree of said throttle valve rotated by said drive actuator;

a first A/D converter for converting an output signal of said throttle sensor into a digital signal;

an amplifier for amplifying the output signal of said throttle sensor;

a second A/D converter for converting the signal amplified by said amplifier into a digital signal;

amplification factor adjusting means for receiving any one of outputs from said first A/D converter and said second A/D converter and for converting said one of the outputs of said two A/D converters so that said converted one of the outputs and the other of said outputs are of the same scale; wherein said drive actuator being controlled based on the output of said amplification factor adjusting means and the output of said A/D converter not through said amplification factor adjusting means; which further comprises:

correcting means for outputting a coefficient for correcting an amplification factor of any one of said amplification factor adjusting means and said amplifier based on the outputs of said first A/D converter and said second A/D converter to adjust the amplification factor.

2. A throttle valve control system according to claim 1, wherein said amplification factor adjusting means is dividing means for dividing the output of said second A/D converter with a coefficient K and is connected to an output terminal of said second A/D converter.

3. A throttle valve control system according to claim 1, wherein said amplification factor adjusting means is dividing means for dividing the output of said first A/D converter with a coefficient K and is connected to an output terminal of said first A/D converter.

4. A throttle valve control system according to claim 1, wherein said correcting means adjust said amplification factor at the time when the output of said second A/D converter is within a predetermined range.

5. A throttle valve control system according to claim 4, wherein the upper limit value of said predetermined range is not smaller than an output value of said first A/D converter corresponding to the maximum opening degree of said throttle valve.

6. A throttle valve control system according to claim 1, wherein said correcting means judges whether said coefficient is within an allowable range, and adjusts said amplification factor if said coefficient is within the allowable range, and switches switch means so as to select the output of said first A/D converter if said coefficient is out of the allowable range.

7. A throttle valve control system according to claim 1, which further comprises:

memory means for storing said coefficient, said amplification factor being adjusted based on the coefficient stored in said memory means.

8. A throttle valve control system according to claim 1, which further comprises:

switch means for selectively switching the output of said amplification factor adjusting means and the output of said A/D converter not through said amplification factor adjusting means; wherein said drive actuator is controlled based on a difference between an actual opening degree signal instructing an actual throttle opening degree output from said switch means and a command opening degree signal for commanding a target throttle opening degree.

9. A throttle valve control method for controlling a throttle valve, comprising the steps of:

producing detection signals representative of an opening degree of the throttle valve and outputting one of the signals to an amplifier with a predetermined amplification factor;

converting the amplified detection signal into a digital signal;

converting a detection signal not amplified into a digital signal;

multiplying a predetermined coefficient to one of said two digital signals so that both of said digital signals become signals having the same scale; and correcting either of said coefficient and said amplification factor based on said two digital signals to provide a throttle valve control signal.

10. A throttle valve control method according to claim 9, the method comprises the step of:

correcting any one of said coefficient and said amplification factor if said digital signal converted from the amplified signal is within a predetermined range.

11. A throttle valve control method according to claim 10, wherein the upper limit value of said predetermined range is not smaller than a value of said digital signal not amplified corresponding to the maximum opening degree of said throttle valve.

12. A throttle valve control method according to claim 9, the method comprises the steps of:

judging whether said correction is within an allowable range; adjusting any one of said coefficient and said amplification factor if said correction is within the allowable range, and selecting said digital signal not amplified and setting said selected digital signal to an actual opening degree signal if said correction is out of the allowable range.

* * * * *